(12) United States Patent
Compton (10) Patent No.: US 7,123,300 B2
(45) Date of Patent: Oct. 17, 2006

(54) IMAGE PROCESSOR AND METHOD OF PROCESSING IMAGES

(75) Inventor: Matthew Patrick Compton, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 678 days.

(21) Appl. No.: 09/918,692

(22) Filed: Jul. 30, 2001

(65) Prior Publication Data

US 2002/0054241 A1    May 9, 2002

(30) Foreign Application Priority Data

Jul. 31, 2000    (GB)    ................................. 0018739.3

(51) Int. Cl.
| | |
|---|---|
| H04N 5/335 | (2006.01) |
| H04N 9/04 | (2006.01) |
| H04N 9/083 | (2006.01) |
| H04N 5/21 | (2006.01) |
| G06K 9/32 | (2006.01) |
| G11C 19/00 | (2006.01) |

(52) U.S. Cl. ...................... 348/280; 348/629; 382/300; 377/67

(58) Field of Classification Search .................. 377/67; 348/252, 253, 273, 274, 275, 276, 277, 279, 348/280, 629; 382/299, 300
See application file for complete search history.

(56) References Cited

U.S. PATENT DOCUMENTS

| | | | |
|---|---|---|---|
| 5,027,204 A | | 6/1991 | Riegel |
| 5,418,907 A | * | 5/1995 | Ohki ...................... 365/230.05 |
| 6,133,953 A | * | 10/2000 | Okada ......................... 348/272 |
| 6,339,479 B1 | * | 1/2002 | Kishimoto ................... 358/1.2 |
| 6,507,364 B1 | * | 1/2003 | Bishay et al. ................ 348/242 |
| 6,570,616 B1 | * | 5/2003 | Chen ........................... 348/272 |
| 6,593,965 B1 | * | 7/2003 | Miyamoto ................... 348/280 |
| 6,642,962 B1 | * | 11/2003 | Lin et al. ..................... 348/252 |
| 6,707,937 B1 | * | 3/2004 | Sobel et al. ................. 382/162 |
| 2005/0105830 A1 | * | 5/2005 | Chung et al. ............... 382/300 |
| 2005/0129306 A1 | * | 6/2005 | Wang et al. ................. 382/156 |

FOREIGN PATENT DOCUMENTS

| | | |
|---|---|---|
| EP | 0 551 040 | 7/1993 |
| EP | 0550231 A1 * | 7/1993 |
| EP | 0 589 721 | 3/1994 |
| EP | 0 595 301 | 5/1994 |
| GB | 2360896 A * | 10/2001 |
| JP | 2003009167 A * | 1/2003 |

* cited by examiner

*Primary Examiner*—David Ometz
*Assistant Examiner*—John M. Villecco
(74) *Attorney, Agent, or Firm*—Oblon, Spivak, McClelland, Maier & Neustadt, P.C.

(57) ABSTRACT

An image processor arranged in operation to generate an interpolated video signal from a received video signal representative of an image. The image processor comprises an adaptable register store comprising a plurality of register elements and is coupled to a control processor which is operable to receive the video signal and to provide pixels of the received video signal, under control of the control processor to an interpolator, selected regester elements being connected to the interpolator to provide the pixels of the received video signal for interpolation, each of the register elements being arranged to store a pixel of the received video signal and each is connected to a plurality of other register elements and is configurable under control of the control processor to feed the pixel stored in the register element to one of the plurality of other register elements in accordance with a temporal reference and the interpolator being coupled to the adaptable register store.

9 Claims, 9 Drawing Sheets

IMAGE PROCESSOR AND METHOD OF PROCESSING IMAGES

FIELD OF INVENTION

The present invention relates to image processors and methods of image processing.

BACKGROUND OF INVENTION

In the field of image processing, there is often a requirement to change the shape of images. In general, images can be represented as sampled values known as pixels. The shape of an image can be changed by interpolating the pixels from which the image is comprised. This could provide for example a linear stretch of the image, or a shape change determined in accordance with a higher order function. The present invention relates to image processors and image processing methods which operate to perform such interpolation.

In order to facilitate explanation and understanding of the advantages provided by the present invention, an example application will be considered of interpolating an image formed using an image lens, which introduces into the image a chromatic error. As such, it will be appreciated that the present invention also relates to video cameras having image processors which operate to improve the quality of an image represented by a video signal generated by the camera, by interpolating at least part of the image.

Optical imaging equipment such as cameras and light projectors are typically provided with an imaging lens, which focuses light to form an image. For cameras, the imaging lens is provided in order to focus an image falling within the field of view of the lens onto a sensor. For colour cameras, the sensor is typically provided with a dichroic element which serves to divide the colour image formed by the lens into red, green and blue components. For colour cameras in which the image is sensed electronically, such as in the case of digital cameras, camcorders, or television cameras, the red, green and blue components are then sampled in order to produce a colour image signal representing in digital form the sampled red, green and blue components of the colour image. In the case of still image digital cameras, the data represented by the colour image signals are stored in order to be reproduced or processed in some way. In the case of television cameras, the colour signals may be recorded, or communicated to a mixing apparatus where for example the camera is used in a television production studio. Similarly however the camera may be a conventional camera in which the sensor is a film which is exposed to a predetermined amount of light produced from the image focused by the lens.

In the above examples a lens is used in order to focus the image falling within a field of view of the lens. However, lenses do not form a perfect representation of the image falling within the field of view of the lens. This is because optical properties of the lens itself cause distortion in the focused image formed by the lens. One example of such distortion is chromatic aberration. Chromatic aberration arises, for example, from dispersion which is a property of the lens resulting from the refractive index of the material forming the lens, such as glass, differing with wavelength. As a result the quality of the colour image formed by the lens is impaired, particularly at the boundaries of the image, where the chromatic aberration causes greatest error.

It is known from co-pending UK patent applications numbers UK 9823400.8 and UK 9823401.6 to improve the quality of an image represented by a video signal by compensating for the effects of the chromatic aberration. This improvement is effected by interpolating between parts of the image represented within a field of the video signal and corresponding parts of the image represented in a different field. As disclosed in these UK patent applications, interpolation can be performed using frame-based interpolation or field-based interpolation. With frame-based interpolation pixels from two or more fields are used to generate an output pixel, whereas with field-based interpolation, pixels from only one field are used. Frame-based interpolation can provide better spatial resolution, because the interpolation is performed on two interlaced fields in which the sampling rate of the video signal is consistent with the bandwidth of the image frequencies made up from the two interlaced fields. As a result an interpolated image produced from frame-based interpolation does not usually suffer from errors introduced by vertical aliasing within the interpolated images. However, if there is motion present in the part of the image being interpolated, the use of two temporally separated fields (in the frame-based interpolation) can produce an inferior image quality because the image has moved between the fields. As explained in UK patent application No. UK 9823400.8, this can cause double imaging. Therefore although framed-based interpolation provides a better vertical resolution, to avoid double images, frame-based interpolation should not be used where the image contains frequencies in the same direction as the motion.

This is because, for example, if the video signal represents the image using vertical frequencies, frame-based interpolation still provides a superior result than field-based interpolation when the motion is horizontal. Field-based interpolation does not generally produce double images, but has lower vertical resolution, and in addition limitations of the interpolation process can include 'softness' in the definition of the image and ringing can be produced which is noticeable to the human eye. Therefore in summary, in the event that there is motion present in the image, then field-based interpolation is preferred, although this can result in a reduction of the image quality as a result of artifacts introduced by vertical aliasing.

It will be appreciated from the foregoing discussion that it remains a technical problem to improve the compensating effects of interpolation to images affected inter alia by chromatic error. However this is but one example application wherein interpolation is applied to the pixels of an image in order to change the shape of the image in some way.

SUMMARY OF INVENTION

According to the present invention there is provided an image processor arranged in operation to generate an interpolated video signal from a received video signal representative of an image, the image processor comprising a register store coupled to a control processor, the register store being arranged in operation to receive the video signal and to provide pixels of the received video signal, under control of the control processor, to an interpolator, the interpolator being coupled to the register store and arranged in operation to generate the interpolated video signal by interpolating the pixels provided by the register store, wherein the control processor controls in operation the register store to provide pixels to the interpolator to interpolate features of the image having both a vertical and a horizontal component.

Previously proposed methods of image processing have been arranged to change the shape of an image by interpolating in one dimension only. However the image processor according to the present invention provides a particular advantage by providing a facility for interpolating in both the horizontal and vertical dimensions of an image.

For the illustrative application of compensating for the effects of chromatic error, it is known to compensate for the effects of chromatic distortion by interpolating the video signal with respect to one dimension. For example, field or frame-based interpolation has been performed with respect to the vertical frequencies of the image. However it has been discovered that by interpolating pixels from an image derived from both horizontal and vertical components, the effects of ringing and resolution loss on diagonal edges of an image as a result of interpolation, can be substantially reduced.

The adaptable shift register may have a plurality of register elements, selected register elements being connected to the interpolator to provide the pixels of the received video signal for interpolation, each of the register elements being arranged to store a pixel of the received video signal and each may be connected to a plurality of other register elements and may be configurable under control of the control processor to feed the pixel stored in the register element to one or other of the other shift registers in accordance with a temporal reference.

By connecting the register elements to a plurality of other register elements and feeding the pixels stored in each register element to one of the other register elements under control of the control processor, the pixels may be shifted through the adaptable register store to the effect of providing the co-sited pixels of a particular part of the image to be interpolated. Interpolation is therefore effected on the contents of the selected register elements. Therefore by controlling which subsequent register element a pixel value held in a current register element is to be communicated, a two dimensional set of spatially related pixels is made available, without requiring a frame store. This is particularly advantageous because frame stores are expensive. As a result of the arrangement of register elements, part of an image may be interpolated in both the horizontal and the vertical directions, and the part interpolated may have more pixels than the number of register elements in the register store.

Although the image processor may receive the video signal in a form in which the lines of pixels are already separated, in preferred embodiments the shift register may comprise a plurality of delay stores coupled in series, a first of the delay stores being arranged to receive the received video signal, each delay store being arranged to delay the received video signal by an amount corresponding to one line of the received video signal, and an output of each of the delay stores may be arranged to feed the delayed received video signal to a corresponding register element.

Although control information indicating the part of the image to be interpolated may be supplied to the image processor, in preferred embodiments the control processor may be arranged in operation to detect the feature of the image having both vertical and horizontal components, the control processor operating to control the configuration of the register elements to provide the input pixels to the interpolator. Thus having found a feature, the control system selects diagonal interpolation over any other form, diagonal interpolation being applied to all pixels within the part of the image being interpolated, regardless of the content.

In preferred embodiments the plurality of register elements may be arranged with reference to plurality of columns, each column having at least two rows of register elements, the plurality of other register elements to which each shift register is connected being at least two of the register element of the next column, the register element one row above of the next column, and the register element one row below of the next column.

With an arrangement in which the positions of the register element reflect the position of the pixels within an image, the shift register can be more efficiently arranged to track two dimensional spatially aligned pixel data.

In preferred embodiments the pixels stored in each of the shift registers on a substantially diagonal line formed on the column and row arrangement of the plurality of register elements are coupled to the interpolator, the interpolation of the received video signal for the feature having vertical and horizontal components being effected for the pixels stored in the diagonal line of shift registers.

According to an aspect of the present invention there is provided a video camera according to claim 8.

According to a further aspect of the present invention there is provided a method of processing an image according to patent claim 9.

Various further aspects and features of the present invention are defined in the appended claims.

BRIEF DESCRIPTION OF THE DRAWINGS

Preferred embodiments of the present invention will now be described by, way of example only, with reference to the accompanying drawings, in which

FIG. 5(*a*) is a somewhat schematic representation of three colour image components of an image formed by the video camera shown in FIG. 3, and FIG. 5(*b*) is a representation of the three colour image components at a different lens setting;

DESCRIPTION OF PREFERRED EMBODIMENTS

Interpolation is performed in order to change the shape of an image. This could be as simple as a linear stretch, or a shape change determined in accordance with a more complicated higher order function. Using interpolation, each pixel of a new stretched image will be derived from a collection of pixels from a source image. To achieve this stretch, an image processor calculates a sub-pixel position in the source for each new pixel. This is used to control an interpolation filter. The calculation can be thought of as providing an error, or a vector with respect to which a source image can be divided into horizontal and vertical components, each of which can be independently interpolated. The error/vector has two parts, an integer shift and a fraction of an integer. The fractional integer part represents a sub pixel position within the source image. To access data at a sub pixel position, an interpolation filter is used. This requires several consecutive sample pixels of the image data which are applied at several taps within the interpolation filter. To perform the integer part of the error/vector, line delays or sample delays are used to form a pipeline from which consecutive pixels of the image are derived. This provides access to several consecutive pixels vertically or horizontally. If more consecutive pixels are available for interpolation than are required for the interpolation process, then an integer shift on the consecutive pixels can be performed, by selecting a set of consecutive pixels from the greater set of available pixels. An example block diagram of an image processor which interpolates image pixels at sub-pixel positions is shown in FIG. 1.

Figure 1:
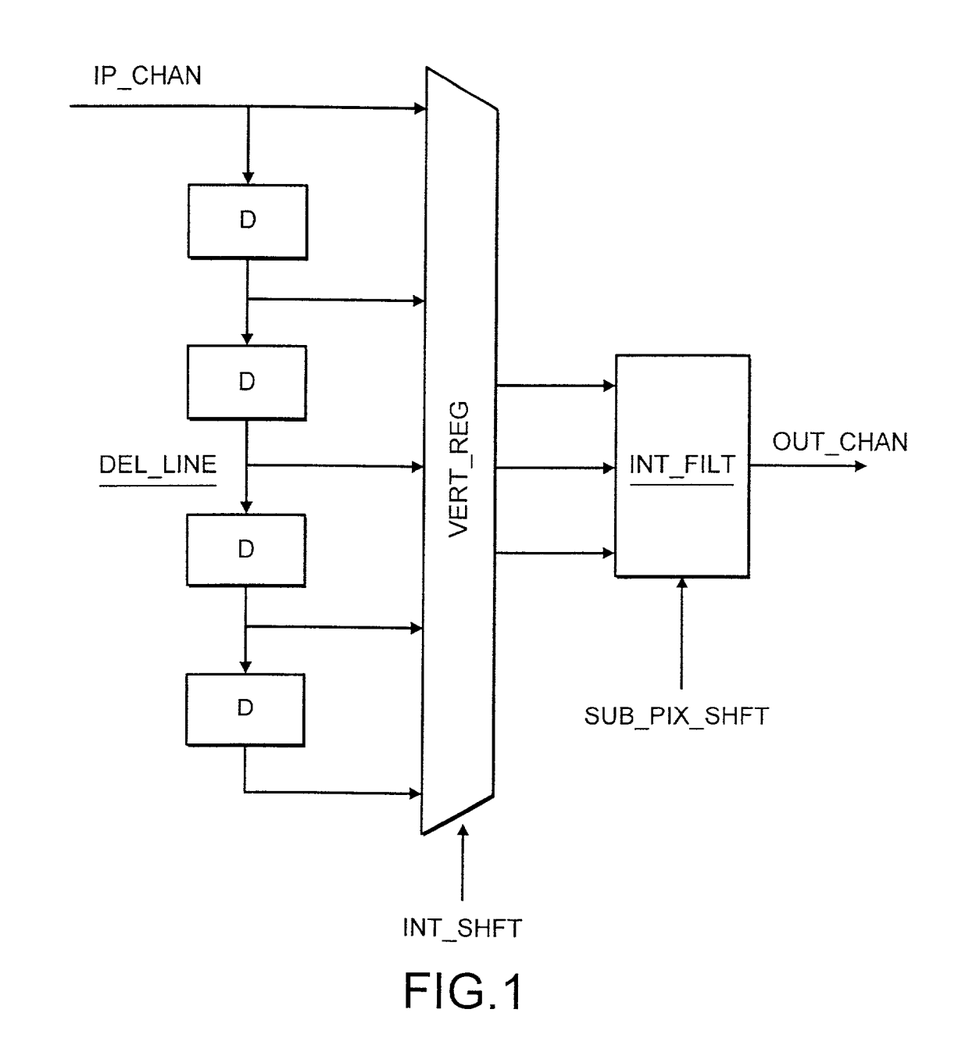
FIG. 1 is a schematic block diagram of a previously proposed image processor for image interpolation.

In FIG. 1, the pixels of an image are fed from an input channel (IP_CHAN) to a vertical shift register (VERT_REG) which is provided with access to the consecutive samples by a vertical delay line (DEL_LINE). However more consecutive samples than are required for interpolation are fed into a vertical register (VERT_REG). As such, an integer shift can be performed on the pixels by only selecting some of the consecutive pixel samples as determined by a control input (INT_SHT). An interpolation filter (INT_FLT) then provides interpolation at a sub-pixel position according to a control input (SUB_PIX_SHFT).

For the example shown in FIG. 1, the vertical shift register (VERT_REG) is arranged to provide three pixel samples to the interpolation filter (INT_FLT) having three taps. However it will be appreciated that any number of pixels could be used. Furthermore although FIG. 1 is arranged to interpolate the image in a vertical plane, it will be understood that an image processor for interpolating in the horizontal plane can be arranged in a corresponding way.

As will be appreciated from FIG. 1, because the input data representing an input image is in raster scan format, the interpolator is arranged to 'visit' every source pixel of the image, generating an interpolated pixel for the new image. For horizontal interpolation a horizontal spatial component is added to horizontally aligned data, whereas for vertical interpolation, a vertical spatial component is added to vertically aligned data. However, embodiments of the present invention are concerned with providing diagonal interpolation. This requires horizontally and vertically aligned data, which is, in other words, two dimensional data.

Figure 2:
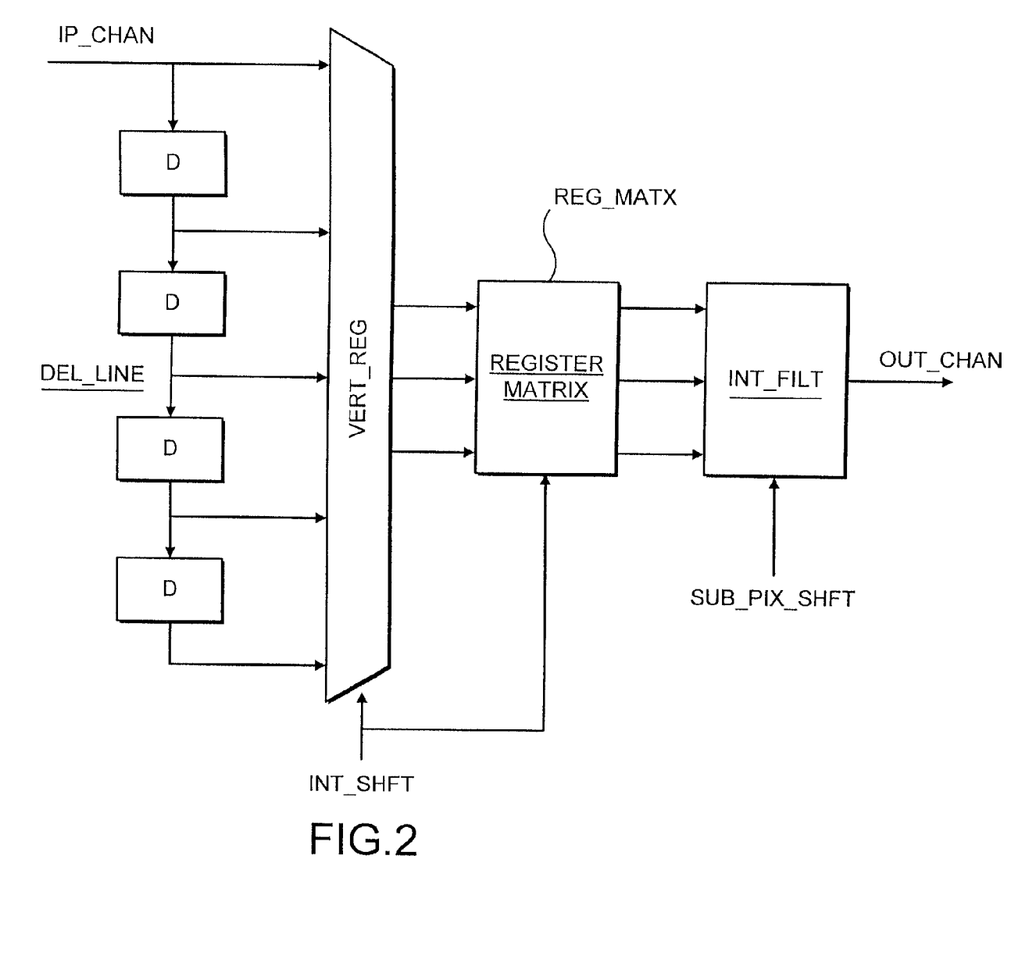
FIG. 2 is a schematic block diagram of an image processor illustrating a first example embodiment of the present invention.

An arrangement of an image processor for providing diagonal interpolation according to an embodiment of the present invention is shown in FIG. 2. The image processor shown in FIG. 2 corresponds substantially to the image processor shown in FIG. 1, and so only the differences from FIG. 1 will be described. In FIG. 2, a register matrix (REG_MATX) is coupled between the vertical shift register (VERT_REG) and the interpolating filter (INT_FLT). The register matrix (REG_MATX) is arranged to provide access to the image pixel samples in both horizontal and vertical dimensions for spatial interpolation. Thus, prior to the register matrix (REG_MATX) the vertical shift register (VERT_REG) provides the integer part of the error/vector on the source data. This is then fed into the register matrix (REG_MATX) which provides access to horizontally and vertically aligned data for the interpolation filter (INT_FILT) which is therefore provided with a facility for performing diagonal interpolation. However a further technical problem exists, because the vertical shift may vary as interpolation progresses along a scan line of image pixel samples. As such, the vertical component introduced with the vertical shift must be replicated through all of the horizontally aligned data in the register matrix (REG_MATX). Thus if the image data from the vertical shift register (VERT_REG) shifts up by one, each register in the matrix must load from the previous sample in the row above and so on. By loading from the previous sample in the row above, the image pixels in the register matrix (REG_MATX) will remain spatially aligned with respect to each other after being displaced in accordance with the vertical shift. The register matrix (REG_MATX) does not track features across the source image, but sequentially processes every source input pixel.

A further embodiment of the present invention will now be described. However, in order to illustrate further the advantageous features of the present invention an example application of embodiments of the present invention will be described. The example application is the correction of distortion in images introduced by chromatic errors. However it will be appreciated that this but one of many possible applications of embodiments of the present invention.

Figure 3:
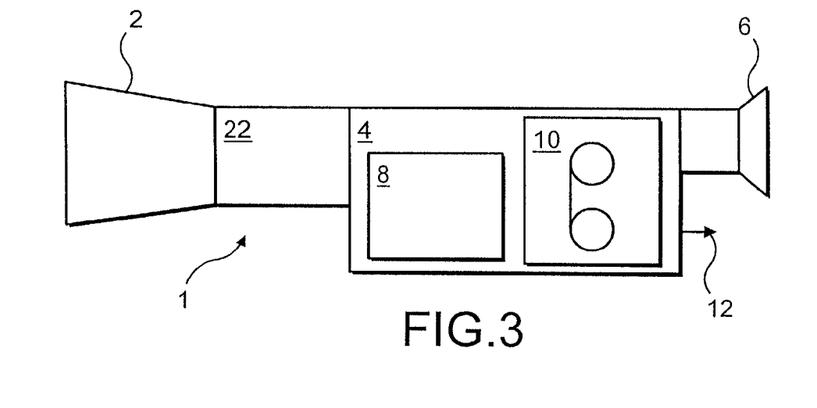
FIG. 3 is a schematic block diagram of a video camera.

As already explained the present invention finds application in correcting distortion caused by the physical properties of an imaging lens within an item of optical imaging apparatus. An example of an item of optical imaging equipment with which embodiments of the invention find application is shown in FIG. 3. In FIG. 3 a television camera 1 is shown to comprise an imaging lens 2 having a lens body 22 which is coupled to a camera body 4 and is arranged in operation to focus an image falling within a field of view of the imaging lens 2 onto a sensor within the body of the camera 4. The television camera is also provided with a view finder 6 which provides an operator with a view of the image focused by the imaging lens of the camera so that the operator may adjust the position, focus and other parameters of the camera in order to optimize the image representing a scene falling within the field of view of the imaging lens 2. Typically the sensor is arranged to generate colour image signals which may be displayed for example on a display means 8 to provide a further illustration of the colour image produced by the camera 1. The use of the display means 8 is more common on hand held video cameras such as domestic "camcorders". The television camera 1 may also include a tape drive 10 which is arranged to record the colour image signals or alternatively the colour image signals may be presented at an output channel 12 to be fed to a separate recording apparatus or a mixing studio. Parts of the television camera 1 which are particularly relevant for facilitating understanding of the present invention are shown in FIG. 4 where parts also appearing in FIG. 3 bear identical numerical designations.

Figure 4:
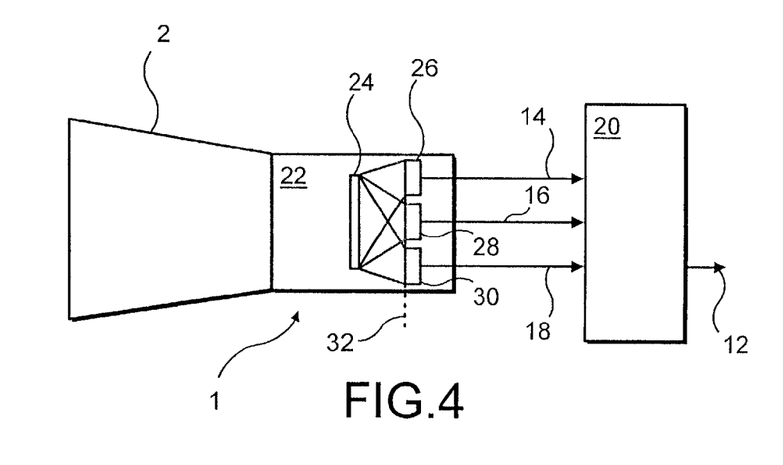
FIG. 4 is a schematic block diagram of a lens arrangement including an image pick-up of the video camera shown in FIG. 3.

In FIG. 4 sensors which form part of a body 22 of the imaging lens 2 is shown to have three output channels 14, 16, 18 which are connected to a processing means 20 which represents all other processes performed by the television camera 1 such as presenting an image through the view finder, recording the colour image signals onto tape or presenting the colour image signals on the output conductor 12. The first, second and third output channels 14, 16, 18 are arranged to convey signals representative of first, second and third data respectively. The first, second and third data are representative of three colour components of the colour image formed by the imaging lens 2. Conventionally the first, second and third components are representative of red, green and blue light. The red, green and blue light components of the colour image are produced by a dichroic element 24, disposed at an imaging plane 32, embodied within the body of the imaging lens 22 which divides the colour image into red, green and blue light components which are arranged to be detected by a corresponding sensor 26, 28, 30. The focus of the lens therefore takes into account the effect of the dichroic element 24 which is usually formed as a splitter prism, whereby the focus accommodates the refraction introduced by the prism. The sensors 26, 28, 30 are arranged in operation to sample the red, green and blue light components and to generate the first, second and third data which are produced and are representative of samples of pixels within each of a plurality of lines which make up the red, green and blue image components. Although in the example embodiment the first, second and third components are representative of red, green and blue light, the components may be representative of light of any wavelength both visible and invisible. Furthermore, the image may be comprised of only two components which suffer from chromatic aberration and are therefore of different sizes. An example of an application involving only two components is the processing of different image components produced from a camera from infra-red light and low intensity visible light, such as might be used as a security camera.

As will be appreciated from the explanation given above, the imaging lens 2 suffers from a chromatic aberration so that, at an imaging plane 32 each of the red, green and blue image components will differ in size as a result of the distortion produced by the chromatic aberration of the lens. This is illustrated in a somewhat exaggerated way by the representation shown in FIGS. 5(a) and 5(b).

Figure 5A:
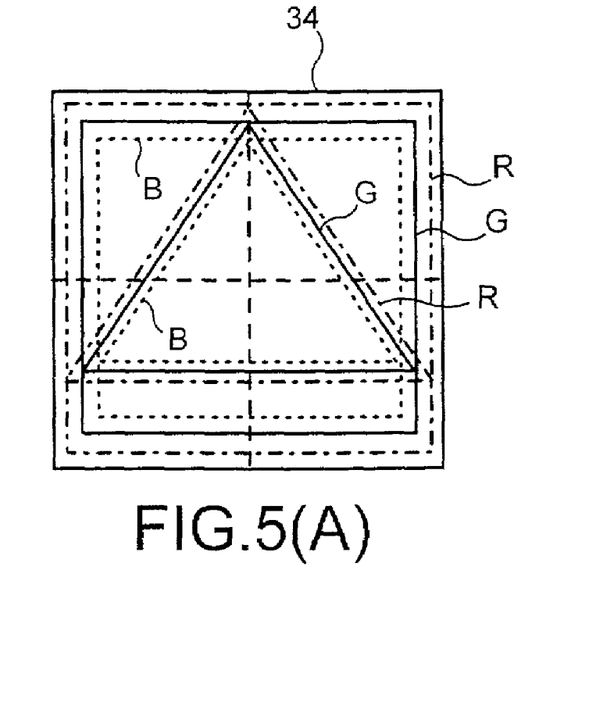
Figure 5B:
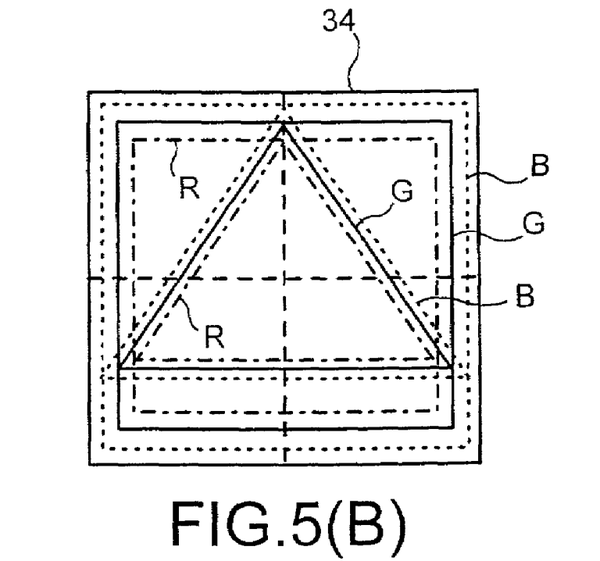

In FIG. 5(a) a reference area represented by the solid square 34 provides an illustration of a detection area which can be utilized and is formed by the dichroic element 24 in combination with the sensors 26, 28, 30. As shown within the reference square 34 a red component of the image R is represented by a dot-dashed line as a square and within the square a triangle. Correspondingly, the green light component representing the same image is shown and illustrated by the solid line G whereas the blue light component is represented by the dotted line B. The same image is represented in FIG. 5(b). However because the imaging lens 2 is a zoom lens, the representation in FIG. 5(a) is shown to illustrate a situation in which the zoom lens is set at a wide angle focus. Correspondingly, FIG. 5(b) is representative of a zoom focus. In this focus, the blue light component now appears as the largest of the three components, and the red light component now appears as the smallest of the three components. This is an illustration of a characteristic of chromatic aberration. The relative size of the different components with respect to the focus of the lens depends on the particular lens being used. In other examples, the red component could appear as the largest component, and the blue component the smallest component, or alternatively both the red and blue components could be smaller or larger than the green component. However in the present example it will be appreciated from the representations shown in FIGS. 5(a) and 5(b) that the red, green and blue light components of the image differ in size as a result of the chromatic aberration. This can be represented as a difference in area formed by the images within the common reference area illustrated by the reference frame 34 since the imaging lens will focus the colour image onto a two dimensional imaging frame formed on a sensor positioned at the imaging plane 32. The sensor is shown in FIG. 4 to comprise three CCD elements 26, 28, 30. However, the sensor could be formed from a single CCD element from which the three colour components are recovered.

Figure 6:
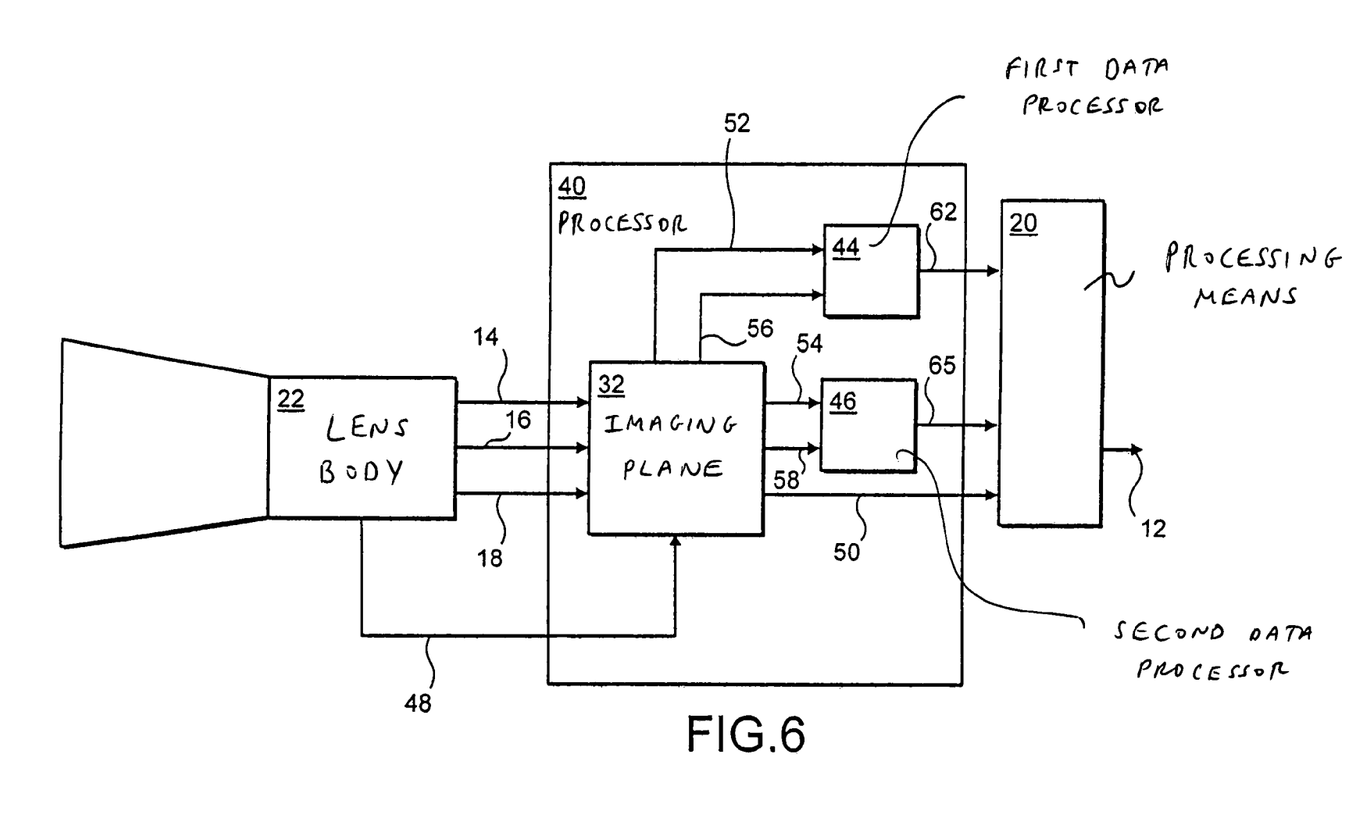
FIG. 6 is a schematic block diagram of the video camera shown in FIG. 3 with a chromatic error correction processor shown in more detail.

The parts of the television camera 1 which are shown in FIG. 4 are reproduced in FIG. 6 together with a more detailed illustration of an image processing apparatus which operates to process the colour image signals to the effect of substantially removing the chromatic aberration. In FIG. 6 an image processing apparatus 40 is shown to comprise a control processor 32 and first and second data processors 44, 46. The first, second and third data are communicated to the control processor 32 via the first, second and third connecting channels 14, 16, 18 which are coupled to three inputs of the control processor. Also shown connected to a further input of the control processor 32 is a control channel 48 which is arranged to convey an aberration signal representative of the chromatic aberration produced for a current focus, zoom and iris settings of the imaging lens 2. In alternative embodiments, the chromatic error in the video signal is derived directly from the video signal itself. This would be performed by the control processor 32, in which case no connection to the lens body 22 would be required.

The aberration signal from the lens body 22 in fact comprises two lens output voltages: $V_{abr}$ representing lateral chromatic aberration introduced by that lens and $V_{dis}$ representing the distortion introduced by that lens. The two lens output voltages are generated by circuitry within the lens from a current zoom, iris and/or focus setting, according to measurement data produced by the lens manufacturer indicating the expected lens aberrations at that particular zoom, iris and focus setting. Techniques for the generation and output of these lens aberration signals are well established in the art.

In operation the control processor 32 is arranged to compare the first, second and third data by analyzing the lines of data representing the sampled red, green and blue images. The control processor operates to determine which two of the red, green and blue image components are the smallest and to determine an amount in terms of lines of the image by which the smallest components differ from the largest of the three image components. The largest of the three components is then fed via a first output channel 50 directly to the further processor 20 as an output version of the colour image signals without being further affected. However, the two image components corresponding to those with smaller areas are fed respectively to the first and second data processors 44, 46 via two further output channels 52, 54. On two further output channels 56, 58, the control processor generates an indication of an amount by which the two smallest image components must increase in size in order to match the largest of the components. The first and second data processors 44, 46 then operate to interpolate the first, second or third data in dependence upon which two of the three are representative of the smallest image components in order to increase the size of these components by the amount determined with reference to the largest component. A result of the interpolation is to compensate for the effects of the chromatic error, so that each of the three image components has substantially the same content.

Figure 7:
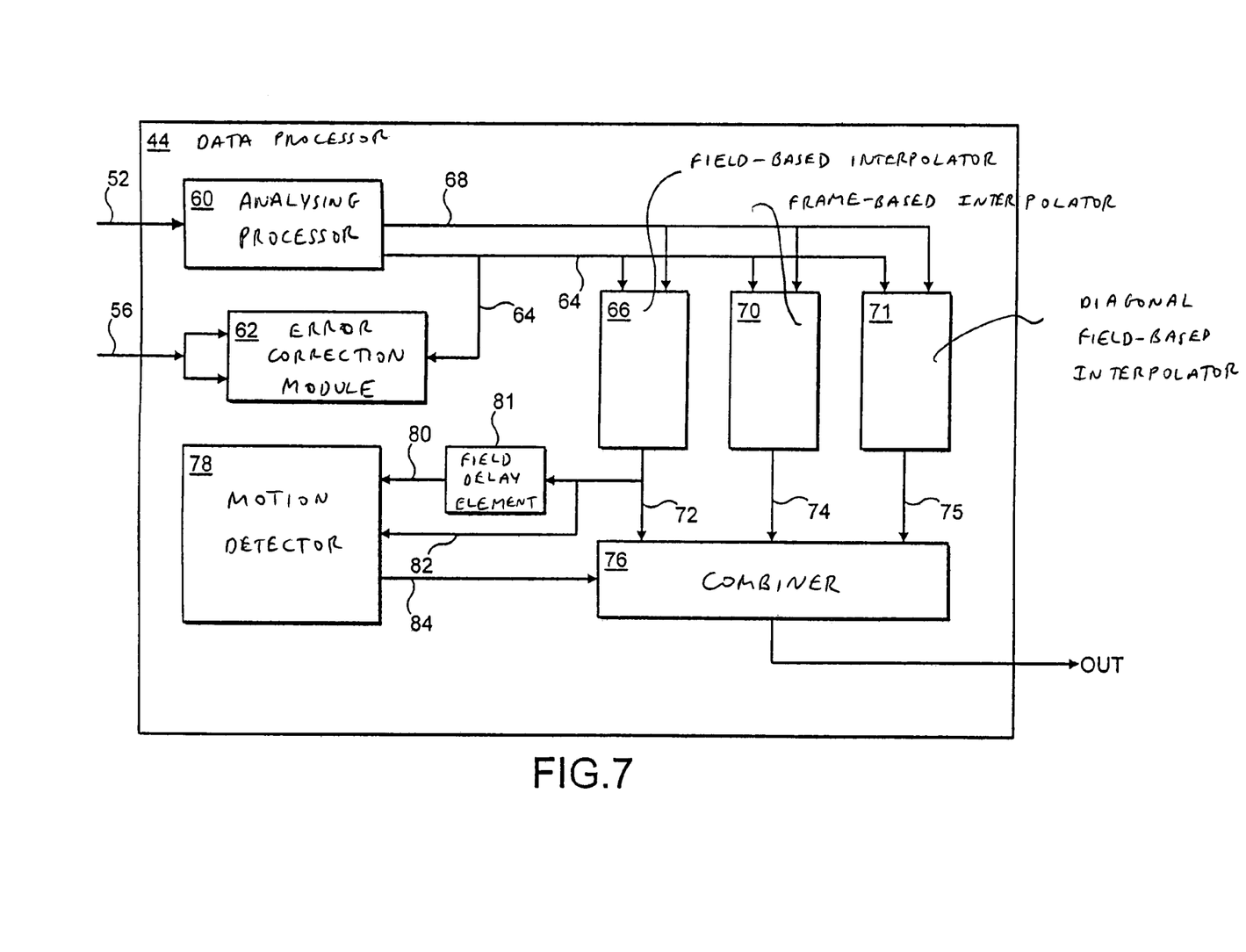
FIG. 7 is a schematic block diagram of a data processor which appears in the error correction processors shown in FIG. 6.

Each of the first and second data processors 44, 46 may embody an image processor which interpolates the two colour image components as disclosed in our co-pending UK patent application serial No. UK 9823400.8. A schematic block diagram of the image processor embodied within the data processors 44, 46 is shown in FIG. 7 in which parts also appearing in FIG. 6 bear the same numerical designations. A brief explanation of the operation of the image processor is provided in the following paragraphs. More details of the operation are disclosed in the co-pending UK patent application.

FIG. 7 schematically illustrates the image processor which corrects the chromatic error produced by the imaging lens. The image processor of FIG. 7 receives a digital video signal from the control processor 32, via connecting channel 52 and the chromatic error signal from the lens 2, via the connecting channel 56. The video processor generates an output video signal at an output OUT, which is fed to the connecting channel 62 of the processor 40. In FIG. 7 the video signal to be interpolated is received by an analysing processor 60. The aberration signal received via the second connecting channel 56 is fed to an error correction module 62. The error correction module 62 generates an error signal from the aberration signal by converting the aberration signal into an error signal having an x, that is a vertical, error component, and a y, that is a horizontal, error component. The error signal is fed to the analysing processor 60 via an error channel 64. The error signal is also received by a field-based interpolator 66, a frame-based interpolator 70, and a diagonal field-based interpolator 71. The video signal received from the input channel 52 is interpolated with respect to a horizontal direction by the analysing processor 60. The horizontally interpolated signal is then fed to the field and frame-based interpolators 66, 70, 71 via a connecting channel 68. The field-based interpolator and the frame-based interpolator 66, 70 operate to perform a vertical interpolation of the video-signal and to generate at respective outputs 72, 74, 75 a field-based and frame-based vertically interpolated signal which are fed to a combiner 76.

The combiner 76, combines the field, frame-based and the diagonally interpolated field-based signals to the effect of selecting one of them or indeed a proportion of one combined with a proportion of the other. The combination is selected in accordance with an amount of motion detected in the video signal by a motion detector 78. The motion detector 78 is fed with two input fields which are separated by one frame period. The separation is effected by a field delay element 81. Thus, on first and second inputs 80, 82 the motion detector receives two fields of the video signal of the same polarity from the output of the field based interpolator 66. The motion detector 78 operates to detect motion in parts of the fields of the video signal and generates and indication of this motion at an output channel 84. If there is motion detected between images in the two fields then field-based interpolation is generally preferred. If the motion detector detects no motion or motion only in a direction perpendicular to the direction which interpolation is formed which in this case is horizontal motion, then frame-based interpolation is preferred. If however motion is detected and there are diagonal components in the image then diagonal field-based interpolation is preferred. As such the combiner 76 selects either the frame-based output signal or the field-based output signal in dependence upon the optimum interpolation technique for the type of motion appearing in images of the video signal. The interpolated output signal is fed to the output channel OUT.

In operation therefore the analysing processor 60 operates to perform horizontal interpolation in accordance with the error signal received via the error connecting channel 64 to the effect of compensating for a horizontal aberration error in the video image. The field-based and frame-based interpolators 66, 70 operate respectively to perform field and frame-based interpolation in the vertical plane as already explained. The diagonal field-based interpolator 71 operates to perform field-based interpolation in a diagonal plane. To facilitate diagonal interpolation, the analysing processor 60 further operates to detect the presence of features such as the edges of objects, which have components in both the horizontal and the vertical directions, and to control the diagonal interpolator accordingly. An example of such a feature is shown in FIG. 8.

Figure 8:
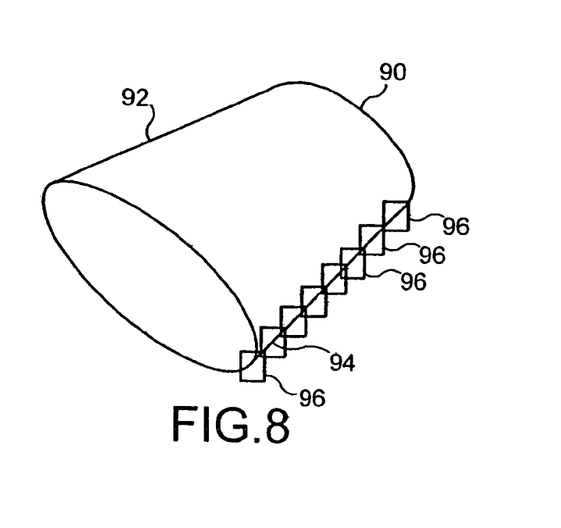
FIG. 8 is an illustrative representation of an image, part of which is selected for diagonal interpolation.

In FIG. 8 an object 90 is shown to have two diagonal edges 92, 94. The edge 94 is further shown with squares 96 which represent pixels which together make up the edge 94. As can be seen from FIG. 8 the edge 94 has a component in both the horizontal and the vertical direction.

As already explained, field-based interpolation produces an improved result when the image within the video signal is moving, because frame-based interpolation can cause double imaging. However field-based interpolation can cause softness in the edges of objects and ringing to the effect that the image interpolated is somewhat blurred. This is as a result of the video signal being interlaced in that the total information of the image is comprised in two fields which form a frame. Therefore interpolating a single field must be done with a sampling rate of the image which is inconsistent with the bandwidth of the image which can cause aliasing and produce ringing effects. In order to mitigate the ringing and softness to diagonal edges, the field-based diagonal interpolator 71 is arranged to perform diagonal interpolation in a case where diagonal edges such as the edges 92, 94 in FIG. 8 are detected. A more detailed block diagram of the field-based diagonal interpolator 71 is shown in FIG. 9.

Figure 9:
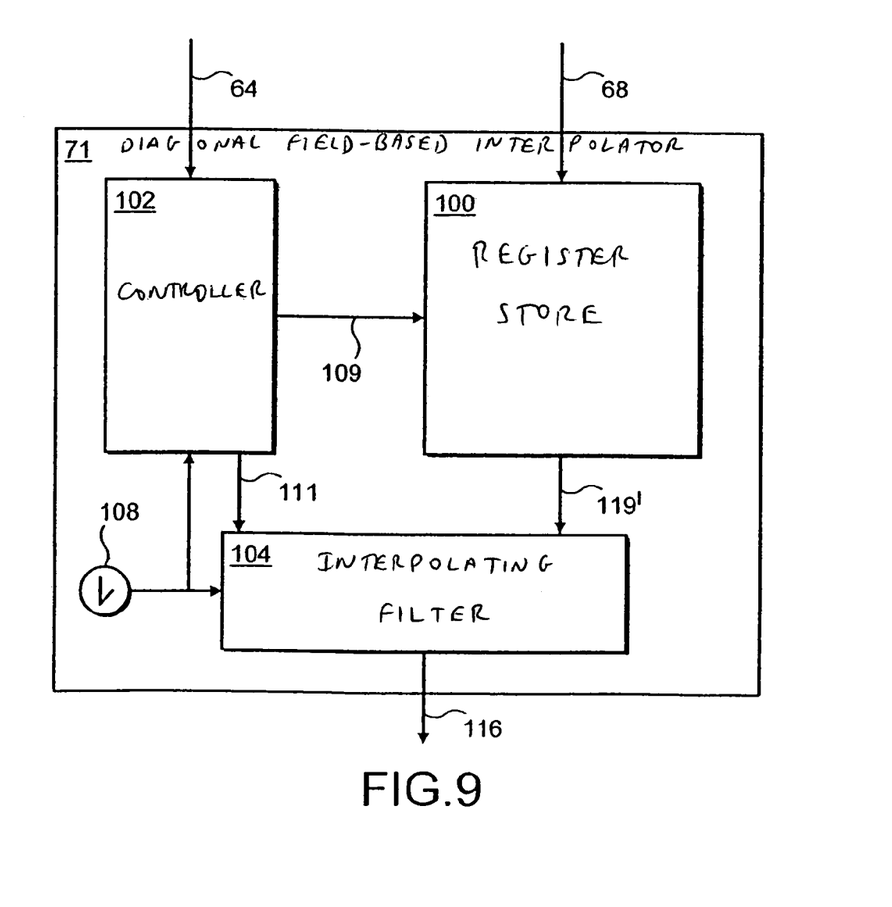
FIG. 9 is a schematic block diagram of a field-based interpolator.

In FIG. 9 the field-based diagonal interpolator 71 comprises an adaptable register store 100, a controller 102 and an interpolating filter 104. The error signal is received via the error channel 64 at the controller 102. The video signal is received, from the analysing processor 60 via the connecting channel 68 at the adaptable register store 100. Generally the controller 102 operates to configure the adaptable register store 100 to feed the pixels associated with a diagonal feature such as the edge 94 shown in FIG. 9 to the interpolating filter 104. The interpolating filter 104 generates an interpolated video signal in which the diagonal edge has been interpolated along the edge in a substantially co-linear direction. The video signal received from the connecting channel 68 is in a form in which each of the horizontal lines of the input field of the video signal are produced sequentially as is consistent with a conventional horizontal line scan interlaced video signal. As a result, a diagonal interpolator would require a frame or field store in order to store all the pixels within the field in order to perform the diagonal interpolation. This is because the diagonal interpolator requires a spatial component to the pixels sampled rather than being in one dimension only such as in the case of a vertical interpolator. However as will be explained, the adaptable register store 100 has a substantial advantage in that it does not require a frame store. Interpolation is performed with reference to a clock 108 which is arranged to feed a clock signal to the controller 102, the register store 100 and the interpolating filter 104.

Figure 10:
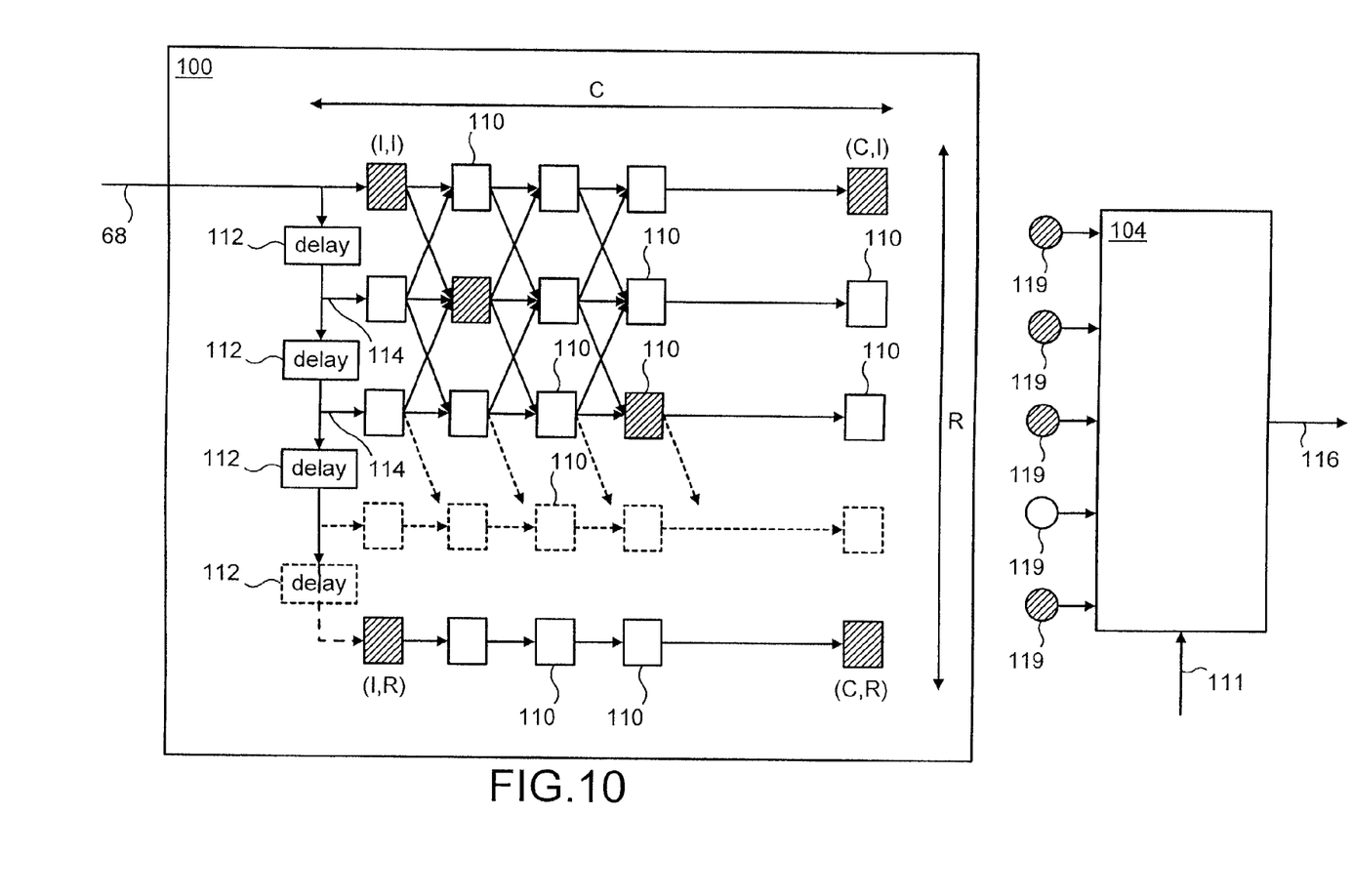
FIG. 10 is a schematic block diagram of an adaptable register store shown in FIG. 9.

The adaptable register store is shown in more detail in FIG. 10. The adaptable register store 100 is shown to comprise an array of register elements 110 arranged in a column by row matrix. For the present example embodiment the matrix of register elements has thirty columns, and in each column there are fifteen rows. Therefore as illustrated dimension C is equal to thirty and dimension R is equal to fifteen. However as will be appreciated other matrix sizes are envisaged. The video signal is received via the connecting channel 68 at a first of the register elements at position 1,1. The video signal is also fed to a first line delay element 112 which forms a cascade of delay elements each of which are connected in series. The delay elements 112 serve to delay the video signal by an amount corresponding to a horizontal line of the video signal. Therefore at each of the outputs 114 the previous line of the video signal is produced and fed to the first register element of each of the rows of the matrix. In effect therefore the cascade of delay elements 112 serves to separate the horizontal lines of the video signal.

Figure 11:
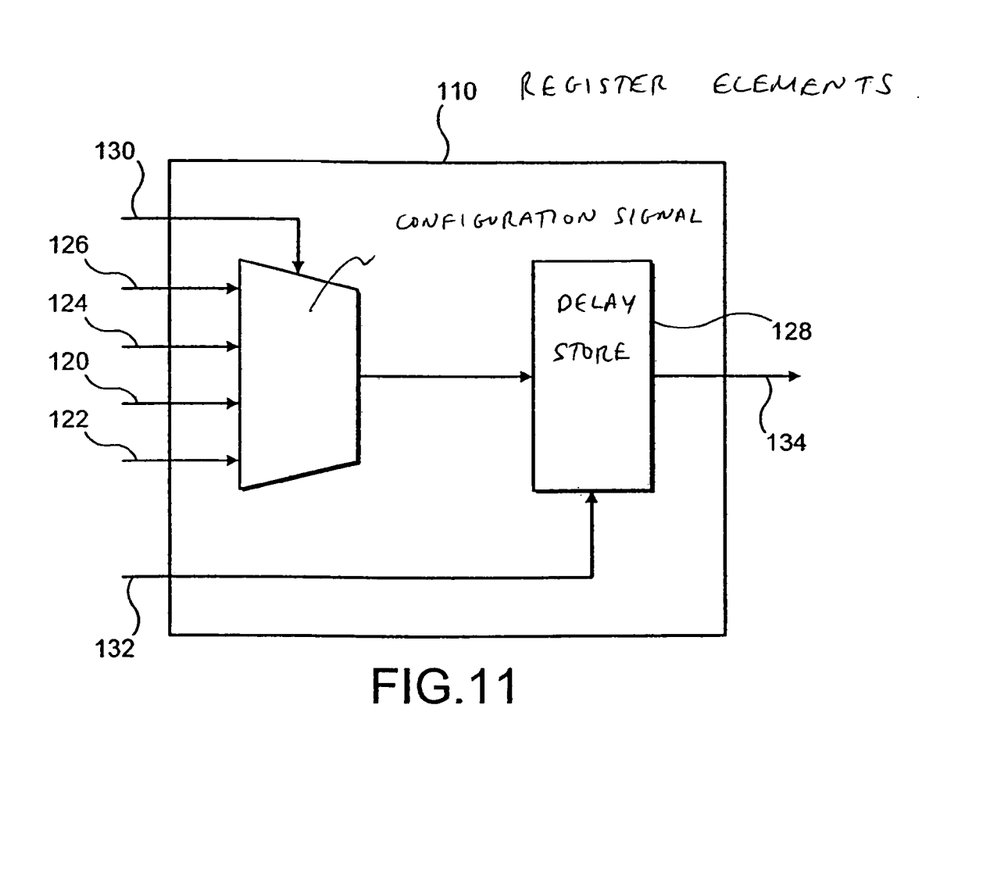
FIG. 11 is a schematic illustration of one of the elements of the adaptable register store shown in FIG. 10.

Each of the register elements 110 operate to store a pixel value in the register. Furthermore in accordance with a clock signal generated by the clock 108 of the field-based interpolator 66, the pixel value of the register element is communicated to a register element of the following column in dependence upon a configuration signal set by the controller 102. As can be seen in FIG. 10 each register element is connected to more than one register element in the subsequent column. The register elements are at least connected to the register element in the corresponding row in the next column. Furthermore the register elements are connected to the register element in the row above and the row below in the next column except where the register element is in the first and last rows. In this case then the register elements are only connected to the row below and the row above in the subsequent column respectively. Thus in accordance with the configuration signal applied to the register elements by the controller 102, the register elements are arranged to shift the pixel value held at a first time t to the register element in the next column to which they are directed by the configuration signals at the next clock period t+1. An example of a register element is shown in more detail in FIG. 11. In FIG. 11 the register element 110 is shown in a general form to have four inputs. These are an input from the previous column on the same row 120, an input from the previous column on the row below 122, and an input from the previous column on the row above 124, and a load from start which would be the corresponding output from the cascade of line delays 112. The configuration of the register element 110 in respect of which of the pixels from the four inputs 120, 122, 124 and 126 is loaded into a delay store 128 is controlled by a configuration signal 130 which is derived from the control signal 109 received from the controller 102. Under control of a clock signal 132 which is derived from the clock 108, the contents of the register store 128 are produced at an output of the register element 134. The output of the register element 134 is connected to the next set of register elements as shown in FIG. 10. Also shown in FIG. 10 is the interpolator 104 which is also arranged to receive a control signal from the controller 102 via a control channel 111. The interpolating filter 104 is arranged in operation to generate output pixels at an output 116 generated by interpolating the pixels of the image represented by the video signal. The pixels which are input to the interpolating filter 104 are fed via a plurality of inputs each one being connected to one of the register elements in each row of the matrix of the adaptable register store 100. This is shown in FIG. 10 as a port 119 being connected to a corresponding input of the interpolating filter 104. Each of the input ports 119 is shaded to reflect that the input is derived from the pixel value held in the register element which is correspondingly shaded within the adjacent row of the matrix. As can be seen in FIG. 10 the register elements of the matrix along the diagonals of the matrix are shaded to show that each of the shaded register elements are connected to one of the input ports 119 of the interpolating filter 104.

In operation the controller 102 operates to adapt the configuration of the output channels of the register elements to the effect of tracking the edge of the feature which is being interpolated. In this case a smaller matrix of register elements can be used to interpolate a diagonal feature having a spatial component that is a component in both horizontal and vertical planes, although the adaptable register is smaller than, and is independent of the actual size of the part of the video image which is being interpolated. Thus in effect the controller 102 configures the register elements to track the edge of the feature being interpolated. Therefore at the output of the interpolating filter 104 an interpolated video signal is generated which has been interpolated in the diagonal direction. Therefore returning to FIG. 9 the connecting ports 119 are shown generally as a connecting channel 119'.

Although the example embodiment of the present invention has been described as being arranged to perform diagonal interpolation for the field-based interpolator, it would be appreciated that the diagonal interpolator could also be applied to the frame based interpolator 70 or the horizontal interpolation performed by the analysing processor 60. Furthermore it will be appreciated that, for convenience the register elements of the adaptable register store are shown in an arrangement of a matrix. However the present invention is not dependent on a particular arrangement and shape of the register elements but could be configured in any other way which will allow a feature of the video signal to be tracked.

Although the example embodiment of the present invention has been described with reference to an interlaced video signal, requiring frame and field based interpolation, it will be appreciated that the present invention finds application in interpolating components of an image represented by any form of video signal, which may not be interlaced.

Various modifications may be made to the embodiments herein before described without departing from the scope of the present invention. It will be appreciated that although the features of the example embodiment are described as data processors, the function of these features could be implemented as a software computer programmed executed on a general purpose data processor in order to achieve the same function. Therefore, a computer program and a computer executing this computer program are aspects of the present invention.

I claim:

1. An image processor arranged in operation to generate an interpolated video signal from a received video signal representative of an image, said image processor comprising:

a register store comprising a plurality of register elements and being coupled to a control processor, said register store being arranged in operation to receive said video signal and to provide pixels of said received video signal, under control of said control processor to an interpolator, selected register elements being connected to said interpolator to provide said pixels of said received video signal for interpolation, each of said plurality of register elements being arranged to store a pixel of said received video signal, two or more of said plurality of register elements having an input connected to a first plurality of the register elements and an output connected to a second plurality of the register elements, the first plurality of the register elements not including any of the second plurality of the register elements, and each of said two or more of said plurality of register elements is configurable under control of said control processor to feed the pixel stored in said register element to one of said second plurality of said register elements to which said register element is connected in accordance with a temporal reference, said interpolator being coupled to said register store and arranged in operation to generate said interpolated video signal by interpolating said pixels provided by said register store, wherein said control processor is operable to detect a feature of said image having both vertical and horizontal components, to control the configuration of said register elements to provide the input pixels associated with said feature to said interpolator to interpolate the feature of said image having both the vertical and the horizontal components.

2. The image processor as claimed in claim 1, wherein said register store comprises a plurality of delay stores coupled in series, a first of the delay stores being arranged to receive said received video signal, each delay store being arranged to delay said received video signal by an amount corresponding to one line of said received video signal, and an output of each of said delay stores is arranged to feed said delayed received video signal to a corresponding register element.

3. The image processor as claimed in claim 2, wherein said plurality of register elements are arranged with reference to a plurality of columns, each column having at least two rows of register elements, the plurality of other register elements to which each of said plurality of register elements is connected being at least two of the register element of the next column, the register element one row above of the next column, and the register element one row below of the next column.

4. The image processor as claimed in claim 3, wherein the pixels stored in each of the plurality of register elements on a substantially diagonal line formed on said column and row arrangement of said plurality of register elements are coupled to said interpolator, the interpolation of the received video signal for the feature having vertical and horizontal components being effected for the pixels stored in the diagonal line of shift registers.

5. The image processor as claimed in claim 1, further comprising:

a clock which is arranged to provide said temporal reference to said register elements, wherein said temporal reference is derived with respect to a rate of receiving said pixels of said received video signal.

6. A video camera arranged in operation to produce a video signal representative of an image formed within a field of view of said camera, said video camera having the image processor as claimed in claim 1 to which said video signal is fed, said image processor being arranged in operation to produce an output video signal by interpolating features of said image having vertical and horizontal components.

7. A method of processing an image represented by a received video signal, said method producing an interpolated video signal from said received video signal, said method comprising the steps of:

identifying a feature in said image having a component in both horizontal and vertical dimensions, identifying input pixels associated with each horizontal line of the video signal, each of the horizontal lines storing a plurality of said input pixels in a register store, said register store having a plurality of register elements, each of said plurality of register elements being arranged to store a pixel of said received video signal, two or more of said plurality of register elements having an input connected to a first plurality of the register elements and an output connected to a second plurality of the register elements, the first plurality of the register elements not including any of the second plurality of the register elements, and generating an output video signal by selectively interpolating said stored plurality of input pixels associated with said feature in accordance with said horizontal and vertical dimensions to generate said interpolated video signal, and updating said register store in accordance with a temporal reference by feeding the pixel stored in one of said plurality of register elements to one of said second plurality of said register elements connected to said register elements.

8. A computer program product having a computer readable medium and having recorded thereon information signals representative of a computer program providing computer executable instructions, which when loaded onto a computer configures the computer to operate as the image processor as claimed in claim 1.

9. A computer program product having a computer readable medium and having recorded thereon information signals representative of a computer program providing computer executable instructions, which when loaded on to a computer causes the computer to perform the method according to claim 7.

* * * * *